(12) United States Patent
Gu et al.

(10) Patent No.: US 12,353,038 B1
(45) Date of Patent: Jul. 8, 2025

(54) OPTICAL FIBER CONNECTOR BOX

(71) Applicant: ACCELIGHT TECHNOLOGIES (WUHAN) INC., Hubei (CN)

(72) Inventors: Gong-En Gu, Hubei (CN); Matthew John Steven Rouleau, Hubei (CN); Neil Santos, Hubei (CN); William Sterling, Hubei (CN); Hengzhi Fan, Hubei (CN); Wenbing Zhu, Hubei (CN); Zhehuanyan Mei, Hubei (CN); Fei Li, Hubei (CN)

(73) Assignee: ACCELIGHT TECHNOLOGIES (WUHAN) INC., Hubei (CN)

( * ) Notice: Subject to any disclaimer, the term of this patent is extended or adjusted under 35 U.S.C. 154(b) by 0 days.

(21) Appl. No.: 19/076,023

(22) Filed: Mar. 11, 2025

(30) Foreign Application Priority Data

Jun. 26, 2024 (CN) .......................... 202410833138.3

(51) Int. Cl.
*G02B 6/44* (2006.01)
(52) U.S. Cl.
CPC .................................. *G02B 6/4442* (2013.01)
(58) Field of Classification Search
CPC ..................................................... G02B 6/4442
See application file for complete search history.

(56) References Cited

U.S. PATENT DOCUMENTS

| | | | | |
|---|---|---|---|---|
| 5,481,639 A | * | 1/1996 | Cobb ................... | G02B 6/4442 385/135 |
| 7,045,710 B1 | * | 5/2006 | Allen ................... | H02G 15/076 174/38 |

FOREIGN PATENT DOCUMENTS

| | | |
|---|---|---|
| CN | 107861203 A | 3/2018 |
| CN | 208569139 U | 3/2019 |
| CN | 110346888 A | 10/2019 |
| CN | 218788107 U | 4/2023 |
| CN | 116125614 A | 5/2023 |

OTHER PUBLICATIONS

Office Action issued by the China National Intellectual Property Administration on Jul. 26, 2024, Application No. 202410833138.3, China.

* cited by examiner

*Primary Examiner* — Sung H Pak
(74) *Attorney, Agent, or Firm* — Troutman Pepper Locke, LLP; Tim Tingkang Xia, Esq.

(57) ABSTRACT

An optical fiber connector box includes an adapter metal bracket, a permanent fiber storage disc and a plurality of expanded optical fiber discs. Kidney-shaped holes are formed in two sides of the expanded optical fiber disc fixed bracket. Each expanded optical fiber disc is connected to the kidney-shaped hole through a disc chaining hinge and can move and rotate along a straight line. A through hole is formed in the middle of the fixed bracket, a protruding structure and an in-groove notch structure are arranged on an inner wall of the hole, and a quick-release supporting member can be inserted to support and replace an upper-layer expanded optical fiber disc. The expanded optical fiber disc is provided with fixed structures in various shapes, and can adapt to different optical modules, and is convenient to disassemble and adjust through the quick-release supporting member and the chaining hinge.

10 Claims, 31 Drawing Sheets

OPTICAL FIBER CONNECTOR BOX

CROSS-REFERENCE TO RELATED APPLICATION

This application claims priority to Chinese Patent Application No. 202410833138.3, filed Jun. 26, 2024, which is hereby incorporated herein in its entirety by reference.

TECHNICAL FIELD

The present invention relates to the technical field of optical fibers, and in particular, to an optical fiber connector box.

BACKGROUND

An optical fiber connector box is an indispensable key connection and protection apparatus in an optical fiber communication network, and is widely applied to different laying manners such as overhead, pipeline and directly buried laying of various optical cables. The optical fiber connector box mainly provides continuous protection for optical continuity, sealing performance and mechanical strength, and is a core device for realizing straight-through and branch connection of the optical cables. The traditional optical fiber connector box is usually made of synthetic plastic, has excellent performance such as high strength, corrosion resistance, and water resistance, and can meet requirements of various application scenarios such as communication, network systems, and cable televisions.

In the prior art, there is a design of an optical fiber connector box with a height-adjustable optical fiber disc, including a box cap structure, a height-adjustable optical fiber disc structure and an end face structure. The height-adjustable optical fiber disc structure is connected to the end face structure through a connecting member and is disposed in the box cap structure. The height-adjustable optical fiber disc structure in such structure includes a connecting piece, a disc base, a multi-layer height-adjustable optical fiber disc and a fiber storage disc. The unwelded optical fiber is wound around the fiber storage disc, the welded optical fiber is wound around the optical fiber disc, and a height of each layer of optical fiber disc can be adjusted based on the number of wound optical fibers. The design aims to meet the requirements for last-mile optical fiber access.

However, the optical fiber connector box in the prior art still has the following defects when meeting the requirements for last-mile access:

1. High cost: the traditional integral design cannot flexibly adjust the capacity according to actual requirements, and the use of the integral design in a tail end access network will result in high resource waste and cost expenditure.

2. Large space occupation: the existing optical fiber connector box is large in size and heavy in structural design, and occupies a large amount of precious space resources when being mounted and used in a limited machine room or an outdoor environment.

3. Poor flexibility: a fixed structural form cannot realize quick plugging and unplugging to replace different types of optical modules, and is difficult to adapt to changing requirements for last-mile access.

4. Difficulty in mounting and maintenance: the integral design makes the mounting and maintenance operation process complicated when adding or replacing a connector box on a built line.

5. Single function: the existing product mainly provides a basic connection protection function, and lacks integration of other common optical path processing functions such as an optical splitter and an attenuator, which brings inconvenience to network operation and maintenance.

6. Limited application environment: the traditional optical fiber connector box is usually designed for an indoor or simple outdoor environment, the protection capacity and reliability are poor in a severe industrial environment, and the application scene is limited.

Therefore, the optical fiber connector box in the prior art still faces many challenges when meeting a special requirement for the last-mile optical fiber access network. A novel optical fiber connector box is urgently needed to solve the above defects and improve the cost performance, flexibility, and reliability of network access.

SUMMARY

The technical problem to be solved in the present invention is to provide an optical fiber connector box, aiming at defects in the prior art. The optical fiber connector box has a revolutionary improvement in the aspects of miniaturization, modularization adaptability, operation convenience, deployment compactness, sealing performance and the like, many defects of an optical fiber connector box in the prior art are well solved. The optical fiber connector box has remarkable practical value and is an ideal solution of a last-mile optical fiber access network.

A technical solution used by the present invention to solve the technical problem is as follows: the present invention provides an optical fiber connector box, including a box body, an end cover assembly, and a hoop assembly, where an internal assembly connected to the end cover assembly is disposed in the box body, the internal assembly includes an adapter metal bracket, an expanded optical fiber disc fixed bracket and a permanent fiber storage disc are connected to the adapter metal bracket, and the permanent fiber storage disc is provided with a plurality of expanded optical fiber discs, where kidney-shaped holes are formed in two sides of the expanded optical fiber disc fixed bracket, each expanded optical fiber disc is connected to the kidney-shaped hole through a disc chaining hinge, the expanded optical fiber disc can displace along a straight line of the kidney-shaped hole, the expanded optical fiber disc can rotate around the disc chaining hinge, a through hole extending along a central axis of the box body is form in the middle of the expanded optical fiber disc fixed bracket, protruding structures and in-groove notch structures are respectively arranged on two inner side walls of the through hole in a mirror image array manner, the protruding structures and notch structures on the two inner side walls are arranged in one-to-one correspondence, a quick-release supporting member can be inserted to the through hole, and the expanded optical fiber disc located on an upper layer of the quick-release supporting member is supported by the quick-release supporting member to rotate by a certain angle.

In a preferred embodiment of the present invention, the quick-release supporting member includes a supporting portion and a connecting portion, and the connecting portion is provided with a protruding portion matched with the notch structure and a notch portion matched with the protruding structure.

In a preferred embodiment of the present invention, the supporting portion is cylindrical, the connecting portion is in a boomerang shape, and an end portion of the connecting portion is provided with a V-shaped end head.

In a preferred embodiment of the present invention, an optional additional fiber storage disc is disposed above the permanent fiber storage disc, the optional additional fiber storage disc is located below the expanded optical fiber disc, and the expanded optical fiber disc is connected to the kidney-shaped hole through the disc chaining hinge.

In a preferred embodiment of the present invention, the expanded optical fiber disc is provided with circular hole structures arranged in an array manner for fixing an optical fiber thermal shrinkage sleeve clamping member, and V-shaped holes and profiling holes for fixing a specially-made optical module.

In a preferred embodiment of the present invention, the optical fiber thermal shrinkage sleeve clamping member is provided with first structural clamping members, and the first structural clamping members are in one-to-one correspondence with the circular hole structures.

In a preferred embodiment of the present invention, the specially-made optical module is provided with V-shaped bosses and profiling bosses, the V-shaped bosses are in one-to-one correspondence with the V-shaped holes, and the profiling bosses are in one-to-one correspondence with the profiling holes.

In a preferred embodiment of the present invention, the end cover assembly includes a main body end cover, and only two groups of sealed cavity structure are disposed on the main body end cover.

In a preferred embodiment of the present invention, the optional additional fiber storage disc is provided with an optical fiber access fiber storage disc interface, an optical cable pre-pressing structure, and a hole structure for connecting the disc chaining hinge.

In a preferred embodiment of the present invention, the adapter metal bracket is fixedly connected to the end cover assembly through a protection structure, an upper end of the adapter metal bracket is fixedly connected to the expanded optical fiber disc fixed bracket, and a lower end of the adapter metal bracket is fixedly connected to the permanent fiber storage disc.

Beneficial effects of the present invention are as follows: miniaturization design is adopted by the present invention, the size of the optical fiber connector box is greatly reduced compared with that of a traditional optical fiber connector box, and the difficulty of transportation and storage is reduced. Meanwhile, in the present invention, through a combination of a permanent fiber storage disc and a detachable expanded optical fiber disc, reasonable distribution of capacity is achieved, the requirements that the number of optical fibers of the last-mile is gradually reduced is met, resource waste is avoided, and the cost is saved;

further, the present invention adopts a modular design and has flexible adaptability. The expanded optical fiber disc is provided with fixed structure of different shapes, such as circular holes, V-shaped holes, profiling holes and the like, and different types of assemblies such as a thermal shrinkage sleeve clamping member and a specially-made optical module can be fixedly mounted, so that the problem that an existing product cannot quickly adapt to a novel optical module is solved. The design has significant flexibility and expansibility, and can quickly respond to changing requirements for last-mile access;

further, the present invention is efficient in operation and convenient to maintain. The quick-release supporting member is in butt joint with a protruding structure and a notch structure of an inner wall of a through hole, so that an upper-layer expanded optical fiber disc can be quickly disassembled. Meanwhile, according to the expanded optical fiber disc, a chaining hinge design is adopted, displacement and rotation adjustment can be carried out along the straight line, and wiring operation is very convenient and efficient. According to the design, the maintenance and replacement process is greatly simplified, and the field operation efficiency is significant improved;

further, the present invention is compact in deployment, space is saved, and a compact design is adopted as a whole. The functional modules are reasonably arranged in a small box body, thereby avoiding space waste and redundancy. Structures such as an optional additional fiber storage disc and an adapter metal bracket are optimized for miniaturization, so that the whole apparatus is suitable for mounting and deployment in a limited machine room and a pipeline environment, and precious space resources are saved;

further, the present invention has excellent sealing performance, and the end cover assembly is simple in sealing cavity point position. A pre-pressing structure is provided at an optical cable access & exit, so that the overall sealing reliability is improved, and normal operation of the apparatus in a severe environment is ensured. The adapter metal bracket is fixedly connected to the end cover through a protection structure, so that the overall impact resistance and the structural rigidity are enhanced.

BRIEF DESCRIPTION OF THE DRAWINGS

The present invention is further described below with reference to the accompanying drawings and embodiments, in the accompanying drawings.

In the figures: 1. box body; 2. internal assembly; 3. end cover assembly; 4. hoop assembly; 5. optical fiber thermal shrinkage sleeve clamping member; 6. specially-made optical module; 2-1. adapter metal bracket; 2-2. protection structure; 2-3. permanent fiber storage disc; 2-4. expanded optical fiber disc fixed bracket; 2-5. optional additional fiber storage disc; 2-6. disc chaining hinge; 2-7. expanded optical fiber disc; 2-8. quick-release supporting member; 2-4-1. protruding structure; 2-4-2. in-groove notch structure; 2-4-3. kidney-shaped hole; 2-5-1. optical fiber access fiber storage disc interface; 2-5-2. optical cable pre-pressing structure; 2-5-3. hole structure; 2-7-1. circular hole structure; 2-7-2. V-shaped hole; 2-7-3. profiling hole; 2-8-1. supporting portion; 2-8-2. connecting portion; 2-8-3. notch portion; 2-8-4. protruding portion; 2-8-5. end head; 5-1. structural clamping member; 6-1. V-shaped boss; 6-2. profiling boss.

DETAILED DESCRIPTION OF THE EMBODIMENTS

To make the purposes, technical solutions, and advantages of the present invention clearer, the following further describes the present invention in detail with reference to the accompanying drawings and embodiments. It should be understood that the specific embodiments described herein are merely intended to explain the present invention, but not to limit the present invention.

Embodiment 1

Figure 1:
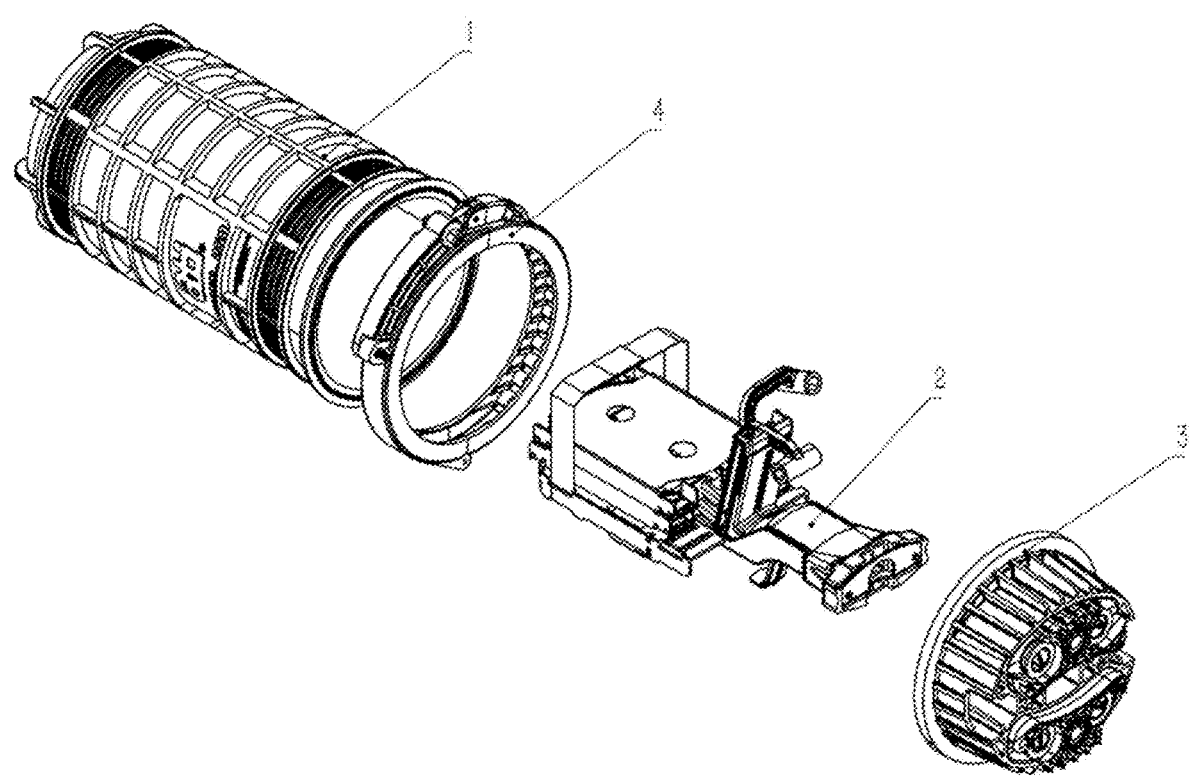
FIG. 1 is a schematic diagram of an optical fiber connector box according to the present invention.
Figure 2:
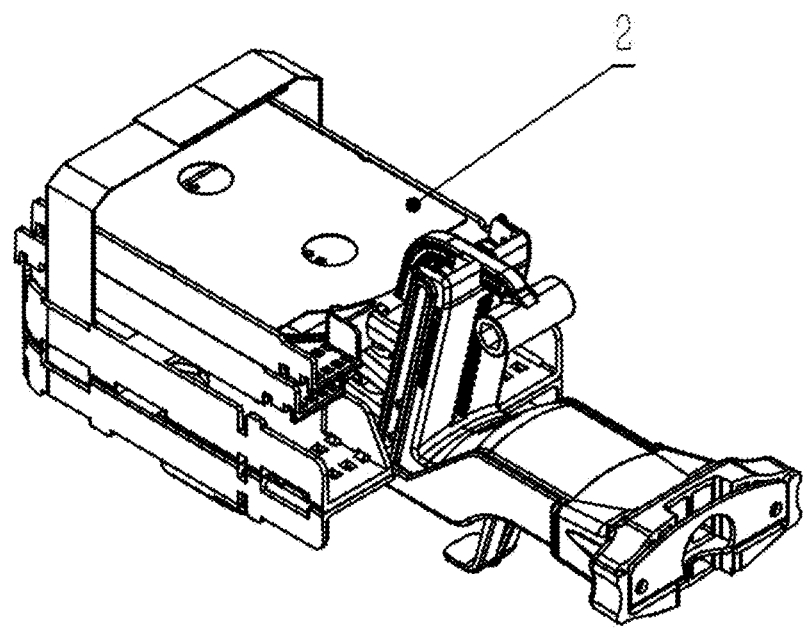
FIG. 2 is a schematic diagram of an internal assembly of an optical fiber connector box according to the present invention.
Figure 3:
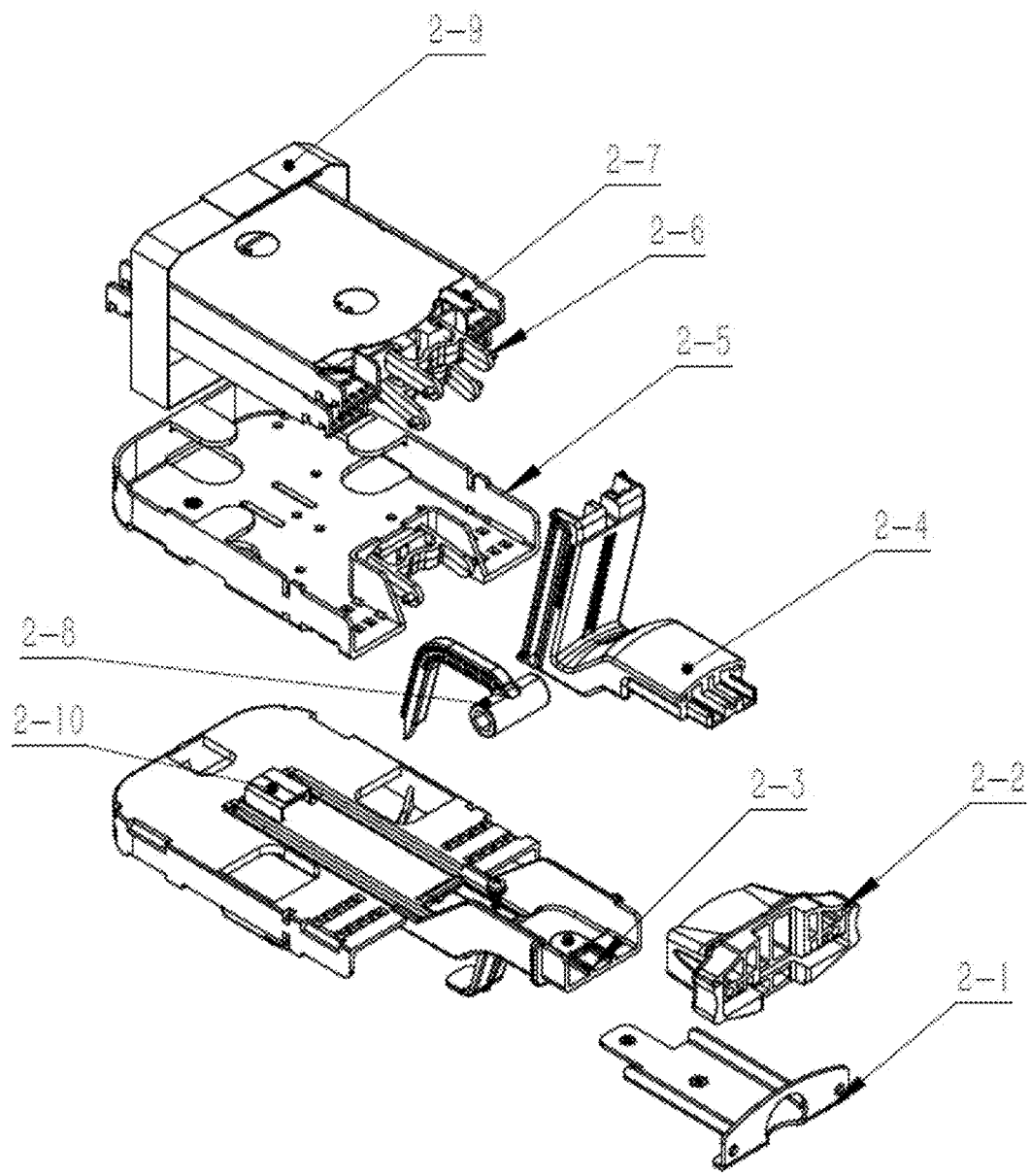
FIG. 3 is an exploded view of an internal assembly of an optical fiber connector box according to the present invention.
Figure 4:
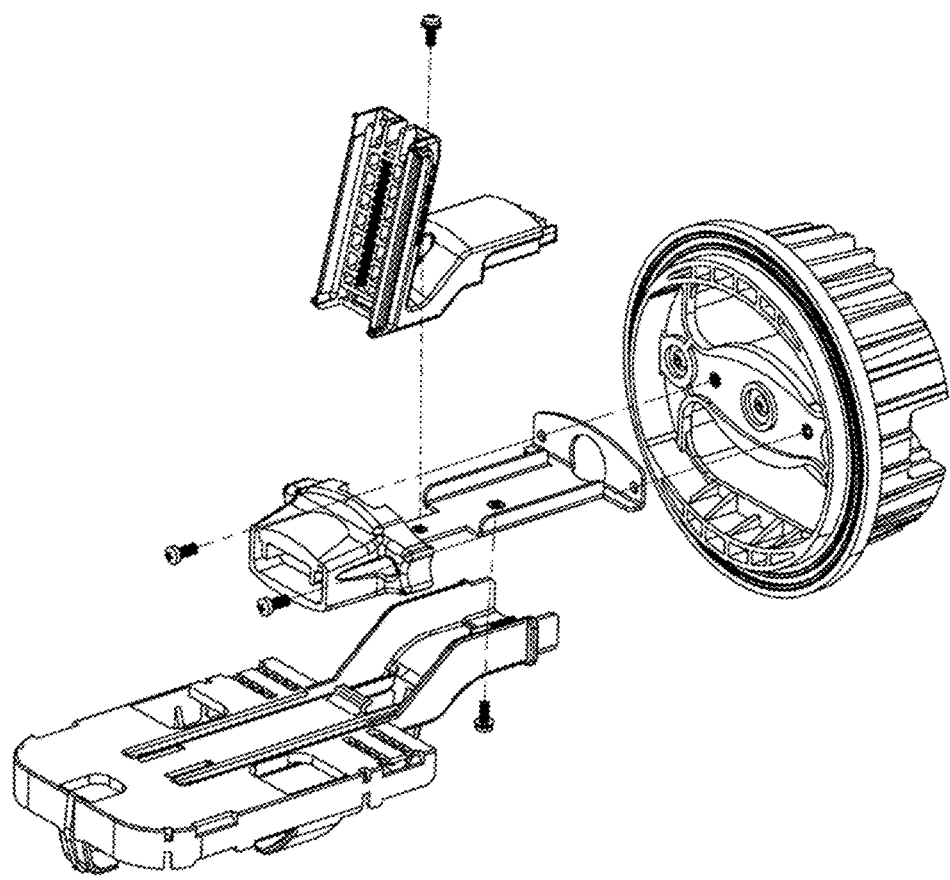
FIG. 4 is a schematic diagram of connection between an internal assembly and an end cover assembly of an optical fiber connector box according to the present invention.
Figure 5:
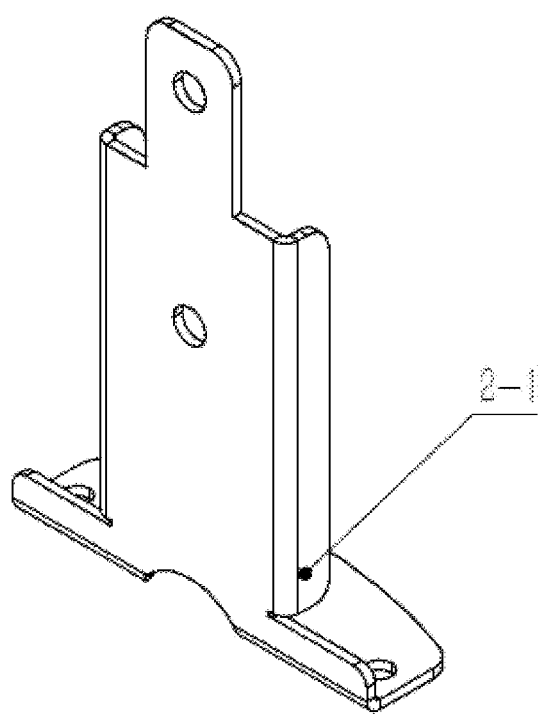
FIG. 5 is a schematic diagram of an adapter metal bracket of an optical fiber connector box according to the present invention.
Figure 6:
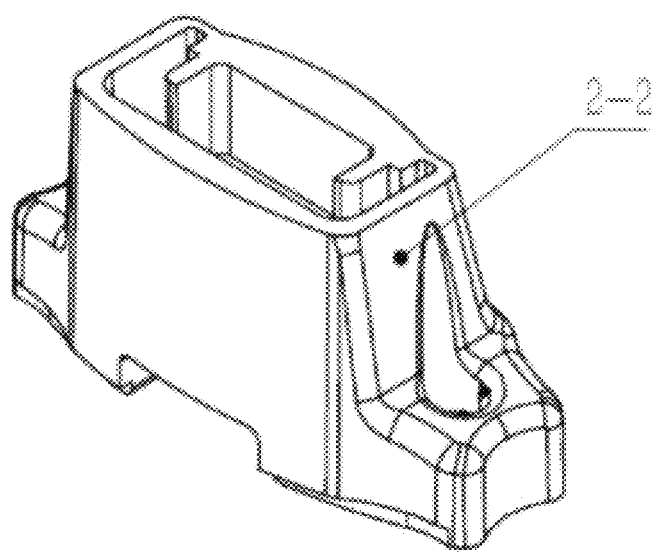
FIG. 6 is a schematic diagram of a protection structure of an optical fiber connector box according to the present invention.
Figure 7:
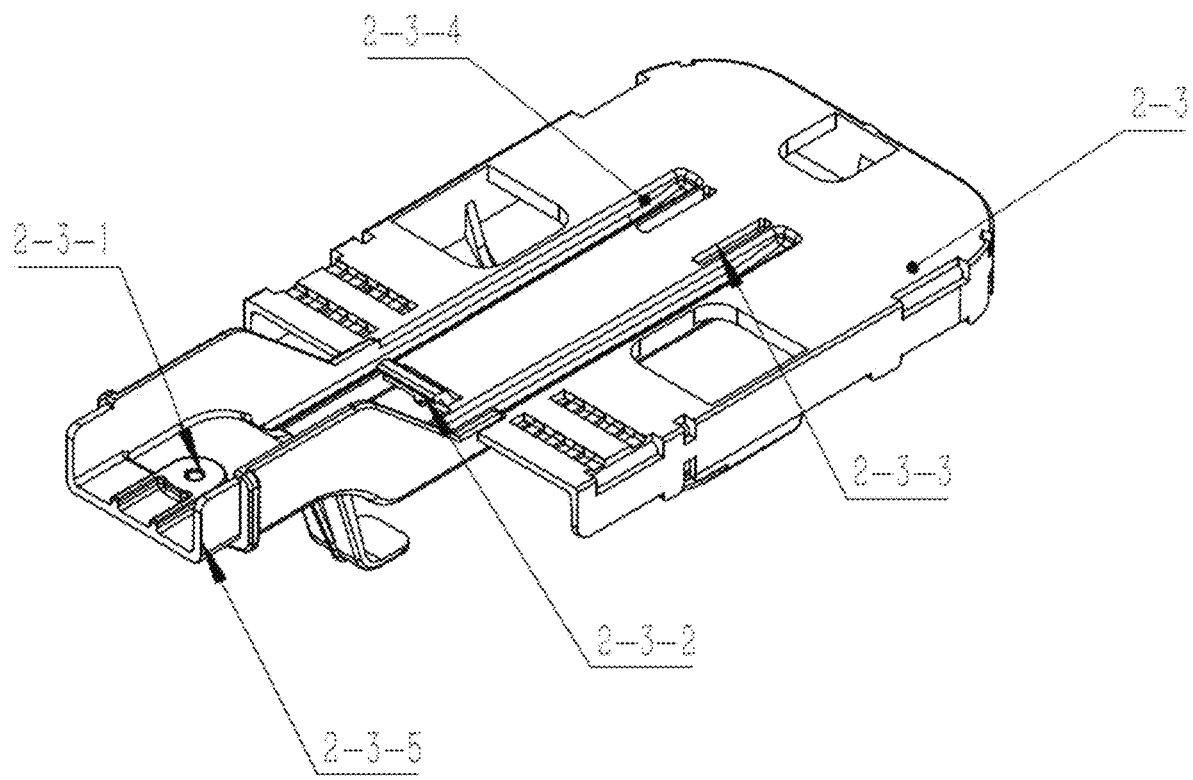
FIG. 7 is a schematic diagram of a permanent fiber storage disc of an optical fiber connector box according to the present invention.
Figure 8:
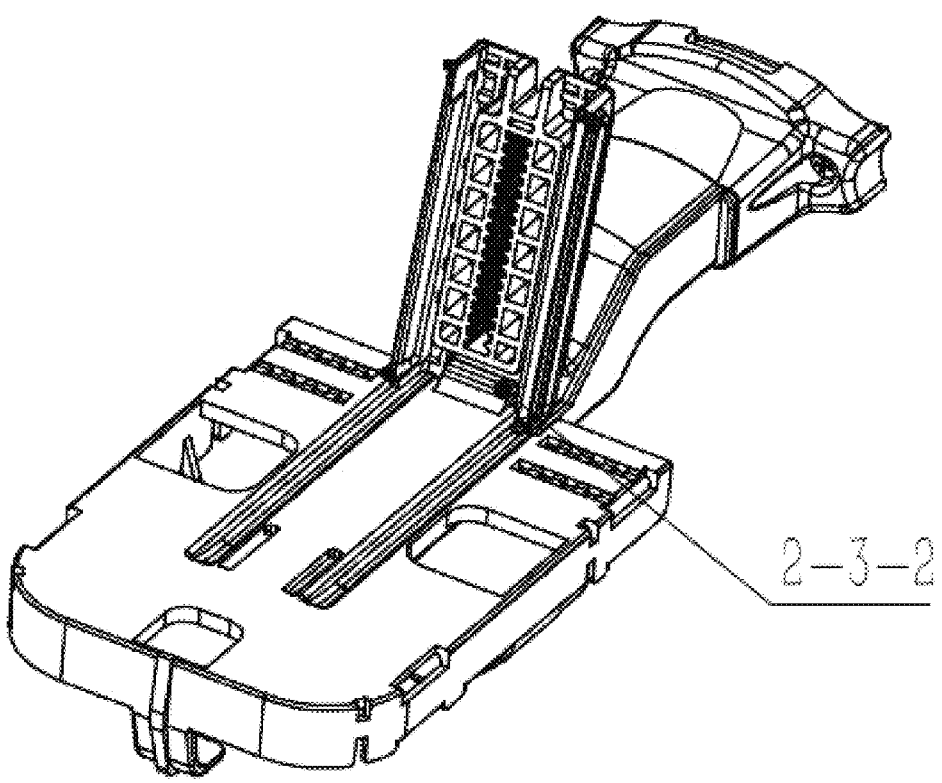
FIG. 8 is a schematic diagram of a permanent fiber storage disc of an optical fiber connector box according to the present invention.

As shown in FIG. 1 to FIG. 8, the present invention discloses an optical fiber connector box, including a box body 1, an end cover assembly 3, and a hoop assembly 4. The box body 1 is connected to the end cover assembly 3 through the hoop assembly 4. The box body 1 can protect an internal structure of the optical fiber connector box, and horizontal and vertical lines on the box body are reinforcing ribs, which serve to reinforce the structural strength of a barrel body.

An internal assembly 2 connected to the end cover assembly 3 is disposed in the box body 1, the internal assembly 2 is fixed to the end cover assembly 3 through a screw, the internal assembly 2 includes an adapter metal bracket 2-1, and the adapter metal bracket 2-1 plays a role in connecting the end cover assembly 3.

An expanded optical fiber disc fixed bracket 2-4 and a permanent fiber storage disc 2-3 are connected to the adapter metal bracket 2-1, the expanded optical fiber disc fixed bracket 2-4 is fixed to an upper end of the adapter metal bracket 2-1 through a screw, and the permanent fiber storage disc 2-3 is fixed to a lower end of the adapter metal bracket 2-1 through a screw. The relative positions of the adapter metal bracket 2-1, expanded optical fiber disc fixed bracket 2-4, and the permanent fiber storage disc 2-3 are fixed. A plurality of the expanded optical fiber discs 2-7 that are arranged in a stacked manner along a vertical direction are disposed above the permanent fiber storage disc 2-3, and the plurality of expanded optical fiber discs 2-7 are integrally fixed to the permanent fiber storage disc 2-3 through felt 2-9.

The technical features of the present invention that make a substantial contribution to inventiveness are as follows: kidney-shaped holes 2-4-3 are formed in two sides of the expanded optical fiber disc fixed bracket 2-4, and an included angle exists between a central axis of the kidney-shaped hole 2-4-3 and a horizontal plane. Each expanded optical fiber disc 2-7 is connected to the kidney-shaped hole 2-4-3 through a disc chaining hinge 2-6, and each expanded optical fiber disc 2-7 can independently displace along a straight line of the kidney-shaped hole 2-4-3. Meanwhile, each expanded optical fiber disc 2-7 can rotate around a disc chaining hinge 2-6, that is, each expanded optical fiber disc 2-7 has two degrees of freedom (one degree of freedom is displaced along the straight line of the kidney-shaped hole 2-4-3 and the other degree of freedom is rotated around the disc chaining hinge 2-6). A through hole extending along a central axis of the box body 1 is form in the middle of the expanded optical fiber disc fixed bracket 2-4, protruding structures 2-4-1 and in-groove notch structures 2-4-2 are respectively arranged on two inner side walls of the through hole in a mirror image array manner. The protruding structures 2-4-1 and the in-groove notch structures 2-4-2 form a sawtooth-shaped structure for fixing a quick-release supporting member 2-8, that is, the effect of temporarily fixing the expanded disc is achieved by the cooperation of the expanded optical fiber disc fixed bracket 2-4 and the quick-release supporting member 2-8, so that when a worker operates a lower disc, an upper disc cannot fall down to affect construction.

The protruding structures 2-4-1 and notch structures 2-4-2 on the two inner side walls are arranged in one-to-one correspondence, the quick-release supporting member 2-8 can be inserted to the through hole, and the expanded optical fiber disc 2-7 located on an upper layer of the quick-release supporting member 2-8 is supported by the quick-release supporting member 2-8 to rotate by a certain angle, that is, the quick-release supporting member 2-8 can be inserted in to the through hole, and the quick-release supporting member is used for supporting the expanded optical fiber disc 2-7 above the Nth layer in a matched manner, to realize replacement of the Nth layer expanded optical fiber disc, where N is greater than or equal to 1.

According to the embodiment of the present invention, the shape of the box body 1 is not limited. In this embodiment, the shape of the box body is a cylinder, or may also be a cube of other shapes. According to the embodiment of the present invention, the shape of the end cover assembly 3 is not limited. In this embodiment, the shape of the end cover assembly is a cylinder, so that the end cover assembly is matched with the box body 1, and in other embodiments, the shape of the end cover assembly may also be a cube of other shapes.

Embodiment 2

Figure 9:
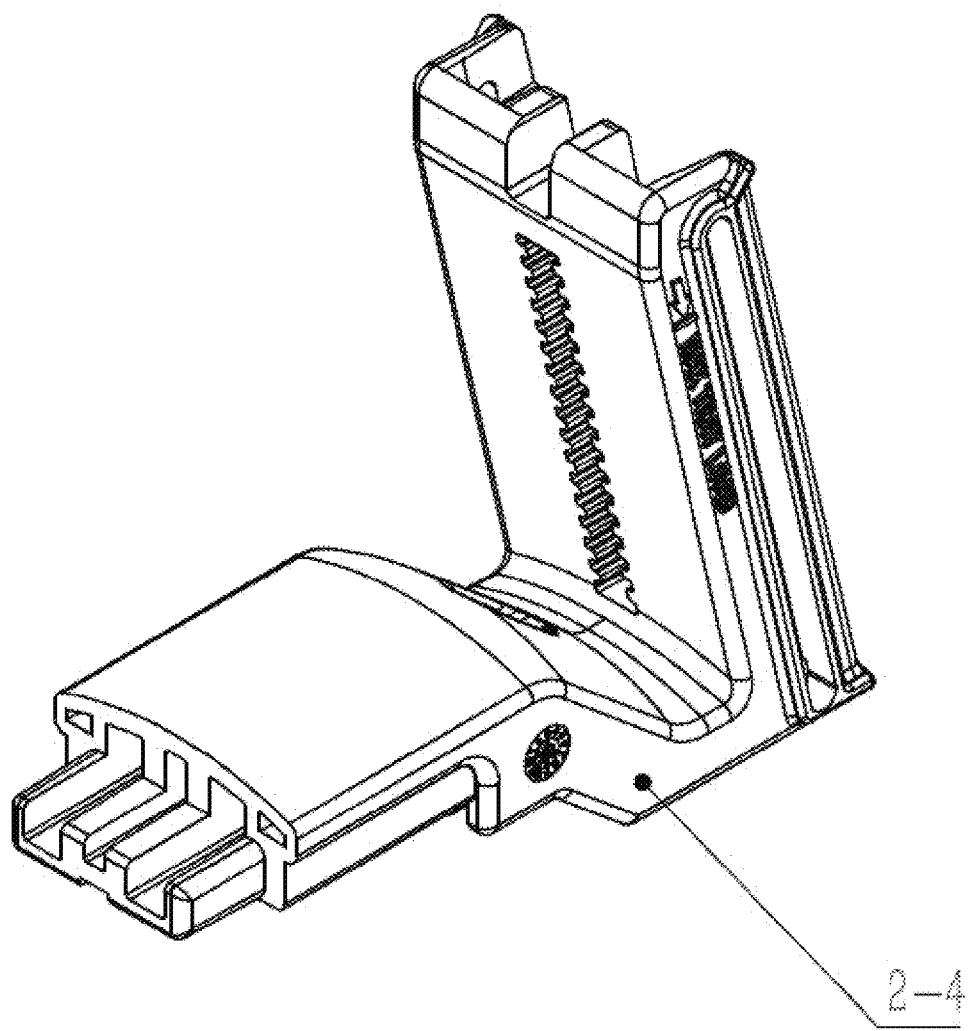
FIG. 9 is a schematic diagram of an expanded optical fiber disc fixed bracket of an optical fiber connector box according to the present invention.
Figure 10:
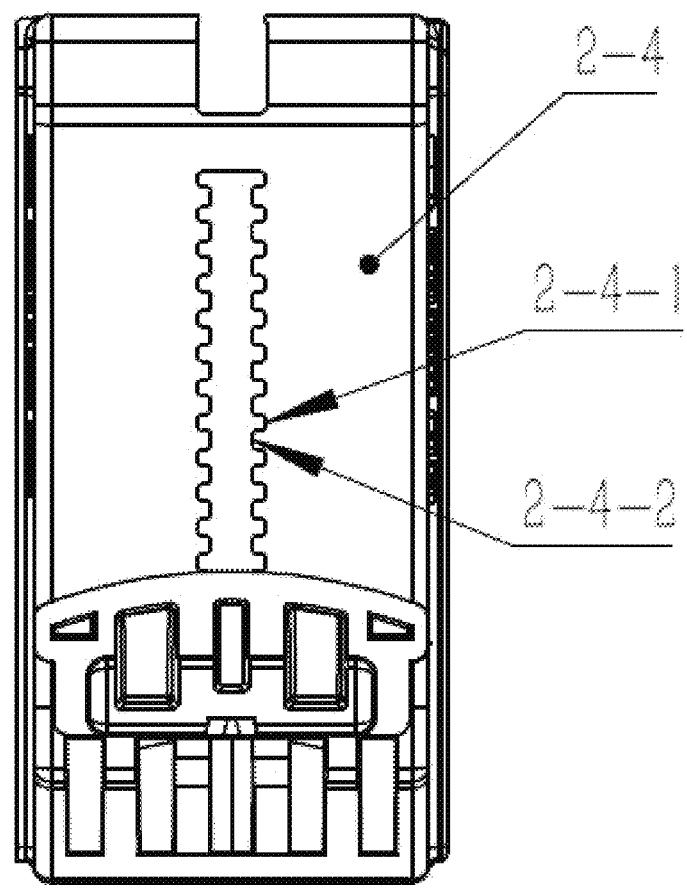
FIG. 10 is a front view of an expanded optical fiber disc fixed bracket of an optical fiber connector box according to the present invention.
Figure 11:
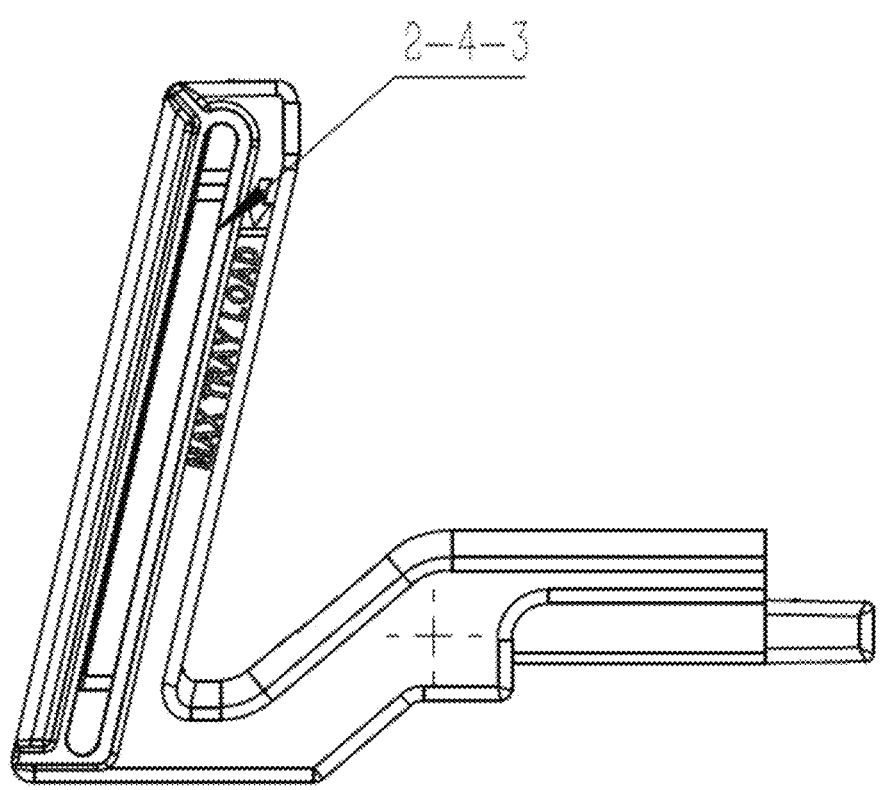
FIG. 11 is a side view of an expanded optical fiber disc fixed bracket of an optical fiber connector box according to the present invention.
Figure 12:
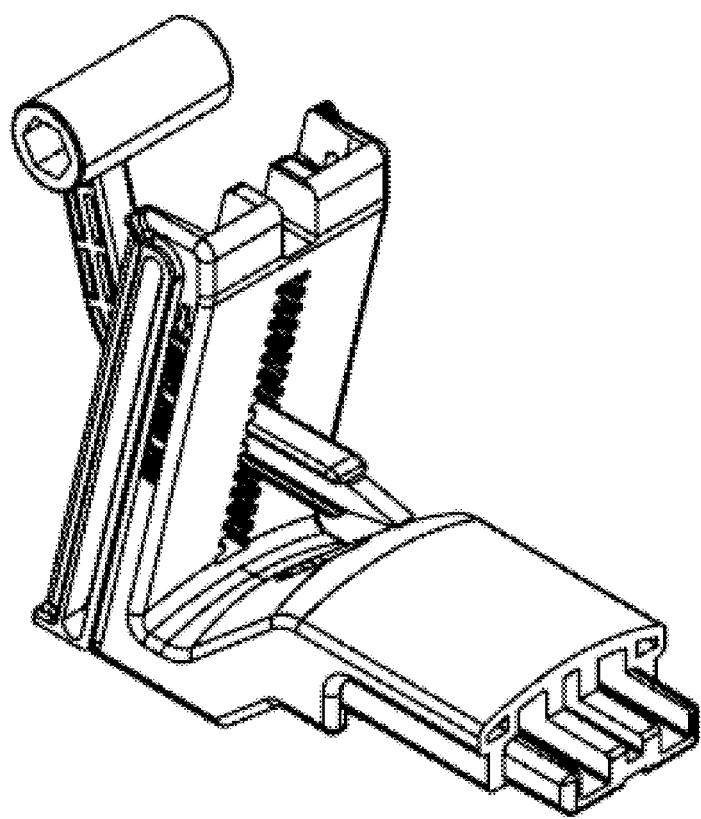
FIG. 12 is a schematic diagram of assembly of an expanded optical fiber disc fixed bracket and a quick-release supporting member of an optical fiber connector box according to the present invention.
Figure 13:
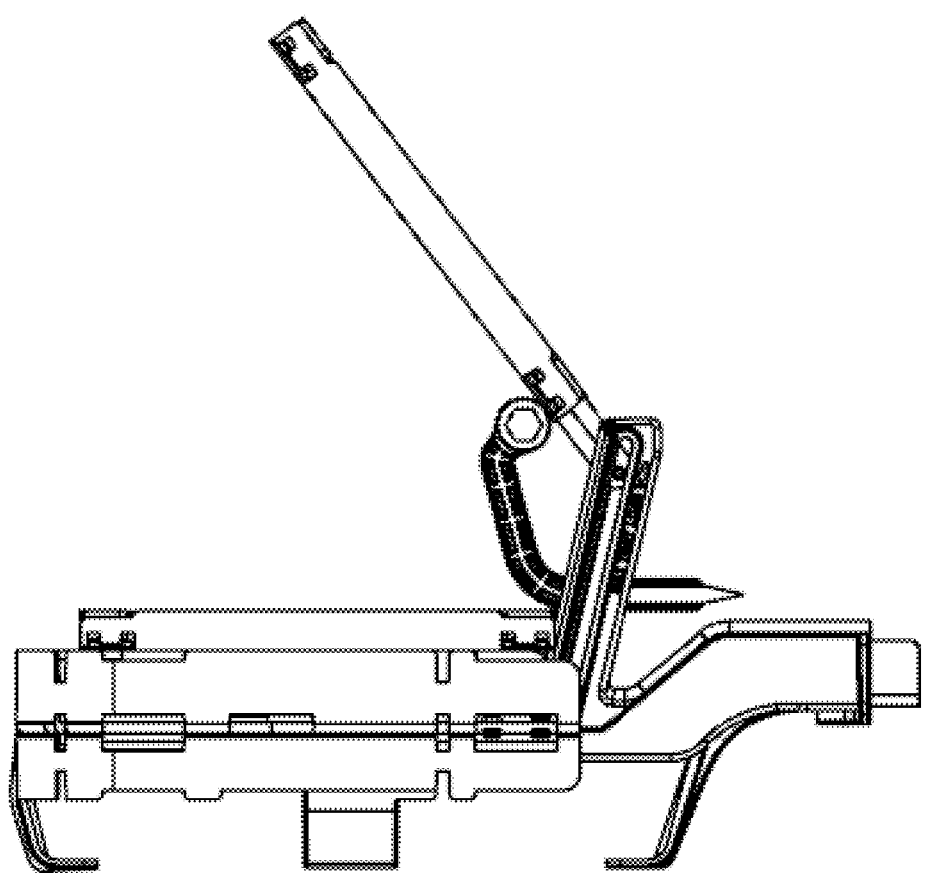
FIG. 13 is a front view of assembly of an expanded optical fiber disc fixed bracket and a quick-release supporting member of an optical fiber connector box according to the present invention.
Figure 14:
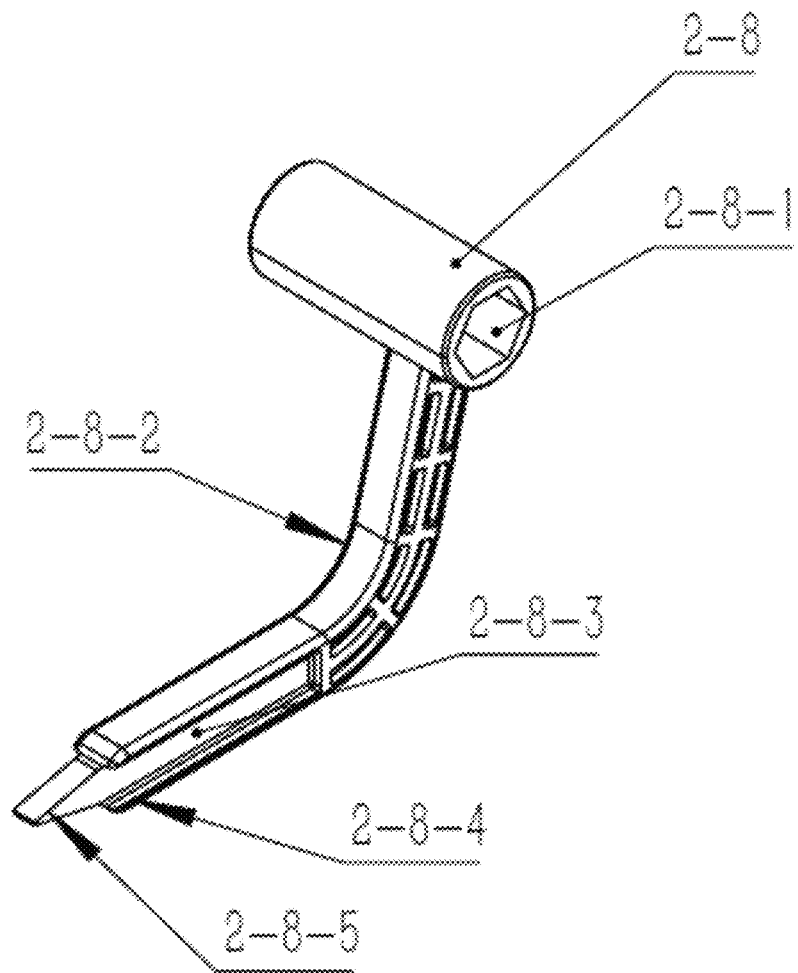
FIG. 14 is a schematic diagram of assembly of a quick-release supporting member of an optical fiber connector box according to the present invention.
Figure 15:
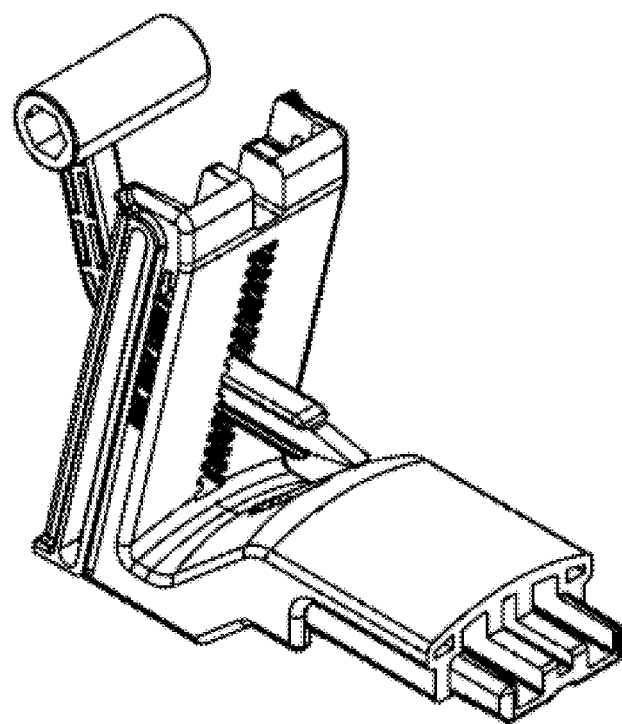
FIG. 15 is a schematic diagram of assembly of an expanded optical fiber disc fixed bracket and a quick-release supporting member of an optical fiber connector box according to the present invention.
Figure 16:
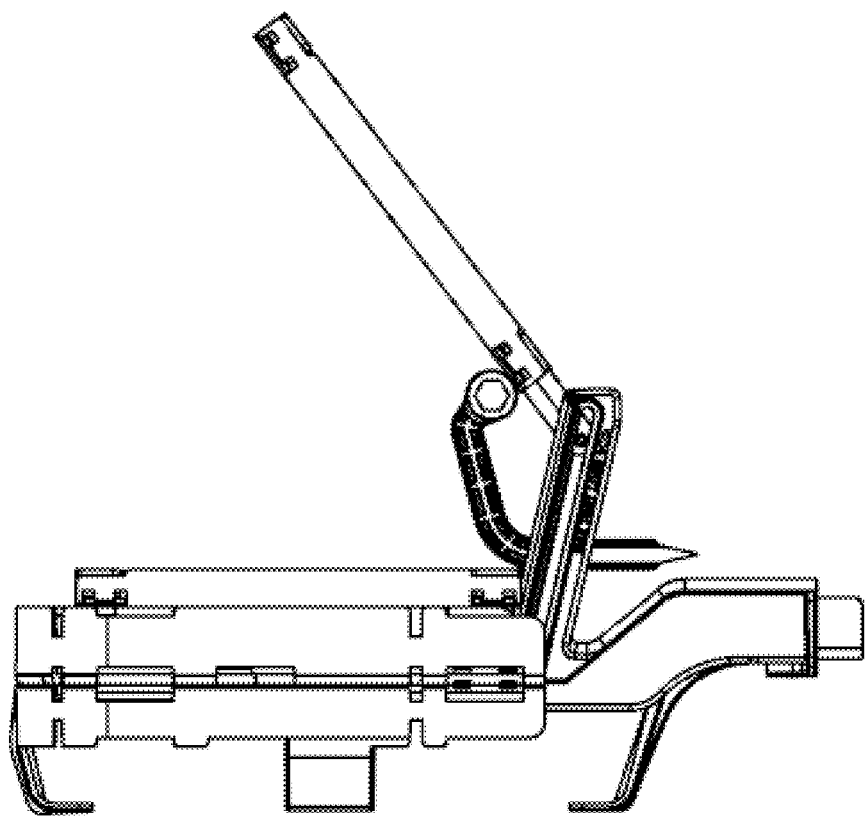
FIG. 16 is a schematic diagram of assembly of an expanded optical fiber disc fixed bracket and a quick-release supporting member of an optical fiber connector box according to the present invention.
Figure 17:
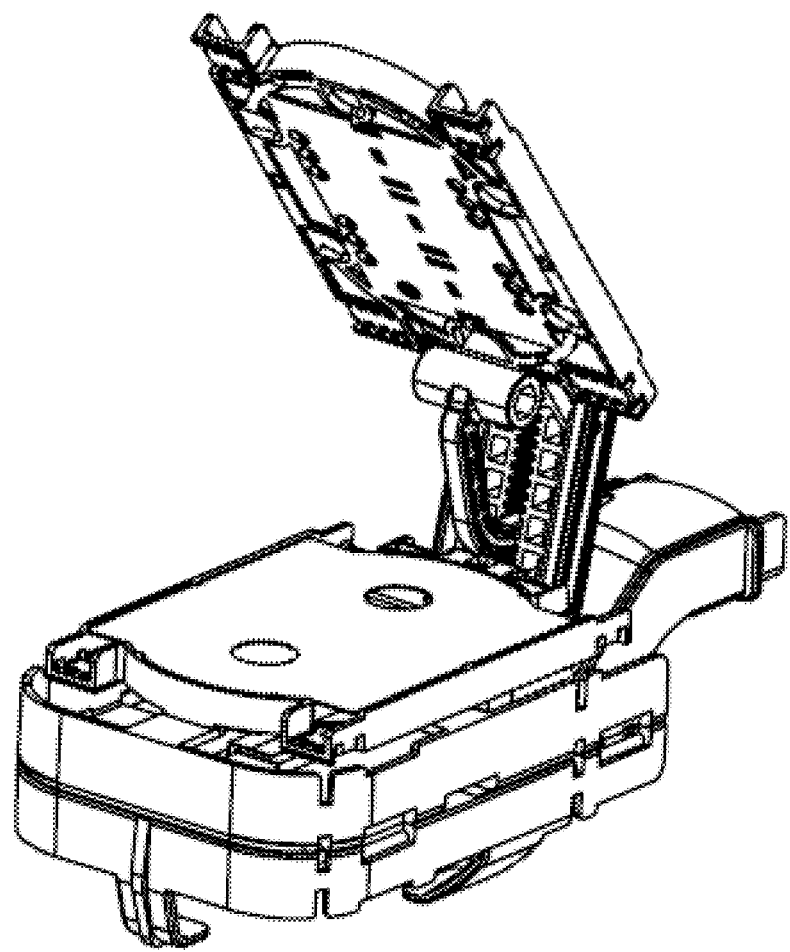
FIG. 17 is a schematic diagram of assembly of an expanded optical fiber disc fixed bracket and a quick-release supporting member of an optical fiber connector box according to the present invention.
Figure 18:
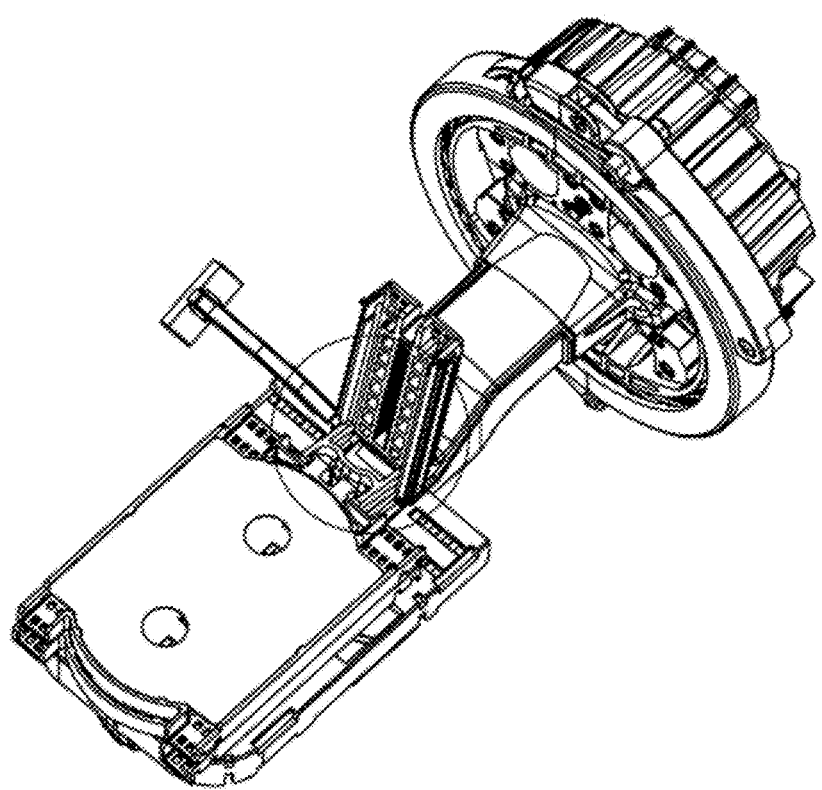
FIG. 18 is a schematic diagram of connection between an internal assembly and an end cover assembly of an optical fiber connector box according to the present invention.
Figure 19:
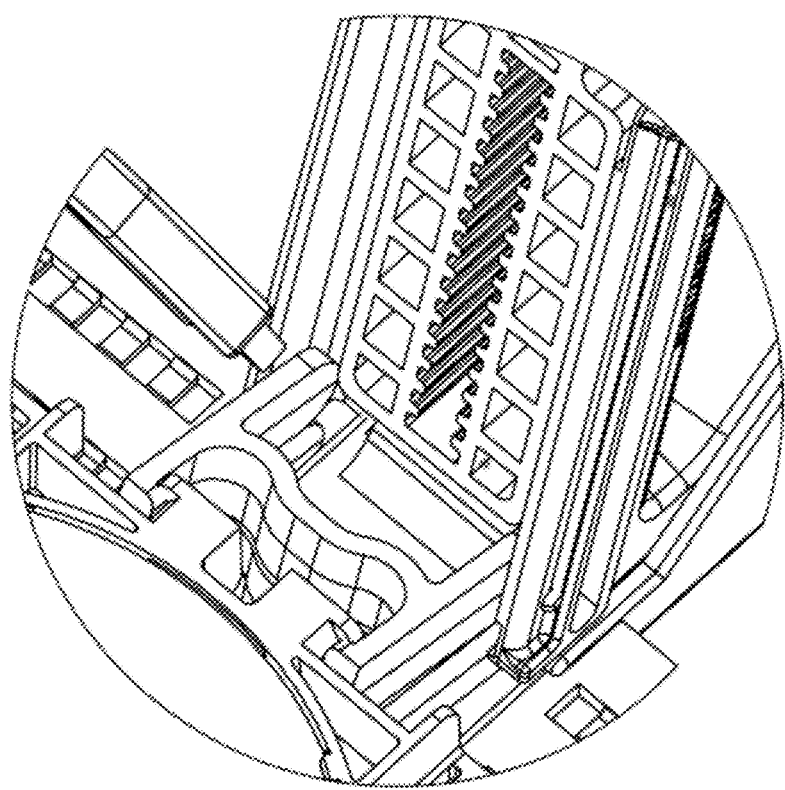
FIG. 19 is a partial enlarged view of FIG. 18.

As shown in FIG. 1 to FIG. 19, in a preferred embodiment of the present invention, the present invention discloses structural design of a quick-release supporting member 2-8 which is simple in structure and convenient to use. The quick-release supporting member 2-8 includes a supporting portion 2-8-1 and a connecting portion 2-8-2. The supporting portion 2-8-1 is of a cylindrical structure, the connecting portion 2-8-2 is of a boomerang-shaped structure, and the supporting portion and the connecting portion are vertically and fixedly connected into an integrated structure. In the present invention, the connecting portion 2-8-2 is provided with a protruding portion 2-8-4 matched with the notch structure 2-4-2 and a notch portion 2-8-3 matched with the protruding structure 2-4-1. The design of the protruding portion 2-8-4 and the notch portion 2-8-3 can ensure that the quick-release member 2-8 is smoothly inserted into each layer of the through hole in the expanded optical fiber disc fixed bracket 2-4, thereby adjusting the height of the quick-release supporting member and facilitating the replacement of the expanded optical fiber disc on different layers.

When the optical fiber connector box in the present invention is used, it is assumed that the fifth layer expanded optical fiber disc from top to bottom needs to be replaced, then the quick-release supporting member 2-8 needs to be inserted between the fourth expanded optical fiber disc and the fifth expanded optical fiber disc. The connecting portion 2-8-2 divides all the expanded optical fiber discs into two parts, and the supporting portion 2-8-1 supports the fourth layer expanded optical fiber disc and all the expanded optical fiber discs above the fourth layer expanded optical fiber disc to rotate same by a certain angle, thereby facilitating manual replacement of the fifth layer expanded optical fiber disc.

In a preferred embodiment of the present invention, the permanent fiber storage disc 2-3 can further be provided with an alignment hole 2-3-1, a protruding pressing tongue 2-3-2, a penetrating felt hole 2-3-3, and a guide rail 2-3-4, and the alignment hole 2-3-1 is used for fixing the permanent fiber storage disc 2-3 to the adapter metal bracket 2-1 passing through a screw. The protruding pressing tongue 2-3-2 can press the expanded optical fiber disc fixed bracket 2-4, and meanwhile, the expanded optical fiber disc fixed bracket 2-4 is limited to be pulled out, thereby achieving the fixed effect, and facilitating the mounting of the product.

Embodiment 3

Further, the optical fiber connector box provided by the present invention can be further optimized on Embodiment 2. For example, a V-shaped end head 2-8-5 can be disposed on an end portion of the connecting portion 2-8-2. The V-shaped end head 2-8-5 makes it easy for the connecting portion 2-8-2 to divide all the expanded optical fiber discs into two parts, so that the assembly efficiency of the optical fiber connector box provided by the present invention can be improved.

Embodiment 4

Figure 22:
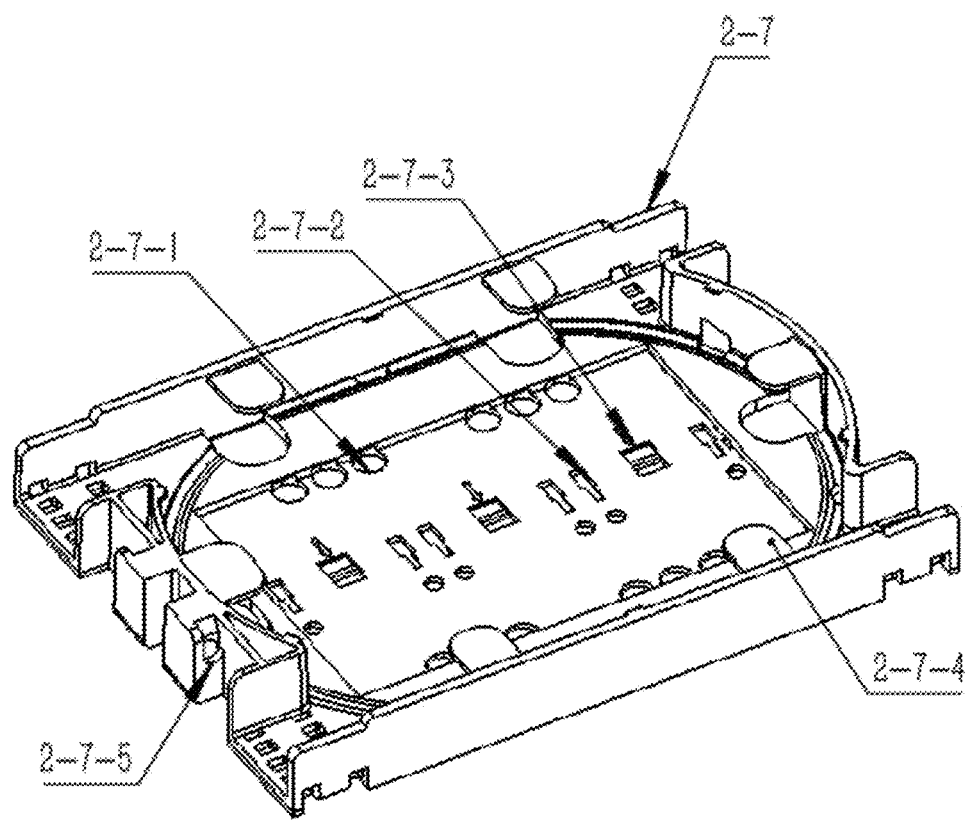
FIG. 22 is a schematic diagram of an expanded optical fiber disc of an optical fiber connector box according to the present invention.
Figure 23:
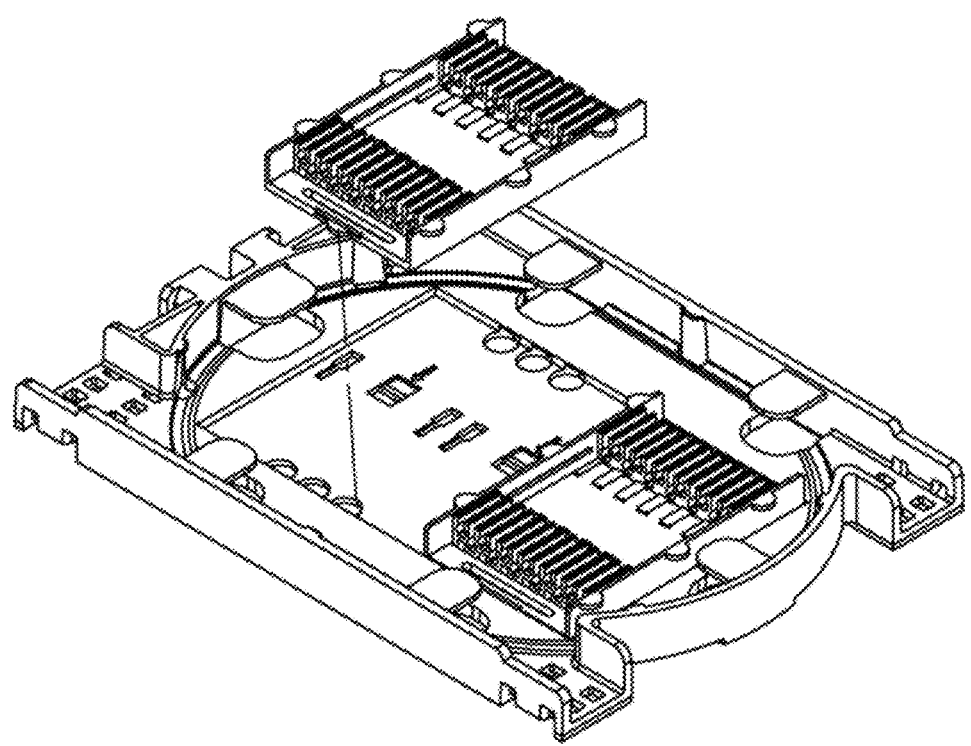
FIG. 23 is a schematic diagram of assembly of an expanded optical fiber disc and an optical fiber thermal shrinkage sleeve clamping member of an optical fiber connector box according to the present invention.
Figure 24:
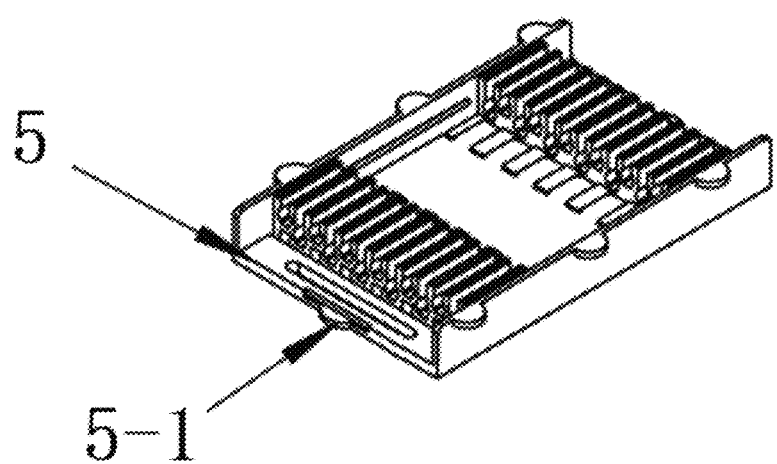
FIG. 24 is a schematic diagram of an optical fiber thermal shrinkage sleeve clamping member of an expanded optical fiber disc of an optical fiber connector box according to the present invention.
Figure 25:
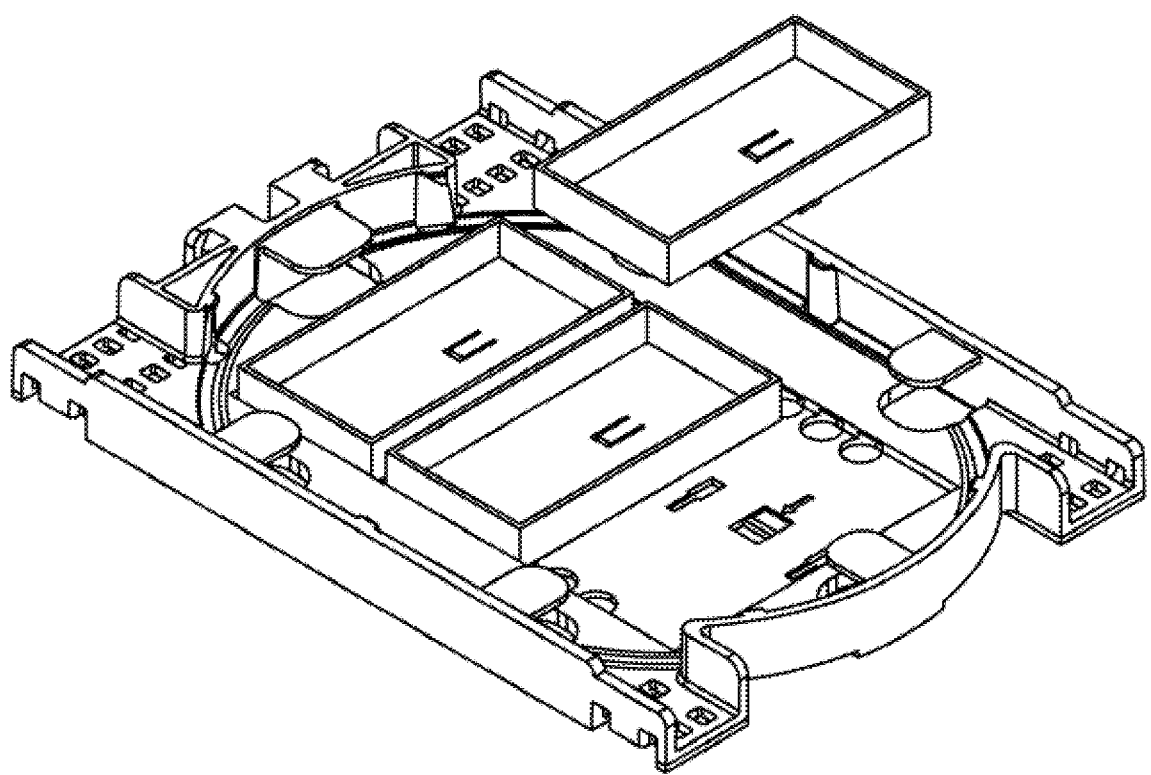
FIG. 25 is a schematic diagram of assembly of an expanded optical fiber disc and a specially-made optical module of an optical fiber connector box according to the present invention.
Figure 26:
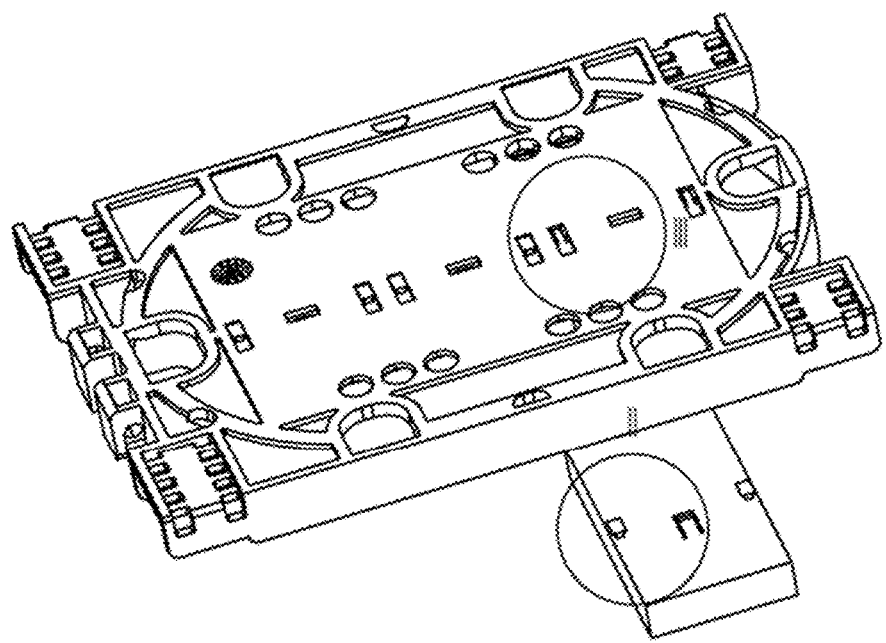
FIG. 26 is a schematic diagram of assembly matching position of an expanded optical fiber disc and a specially-made optical module of an optical fiber connector box according to the present invention.
Figure 27:
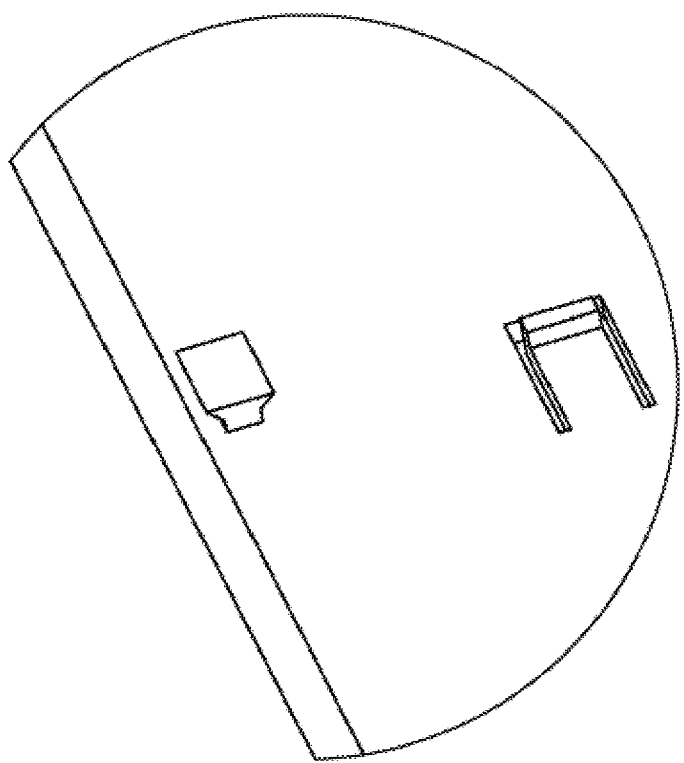
FIG. 27 is a partial enlarged view of FIG. 26.
Figure 28:
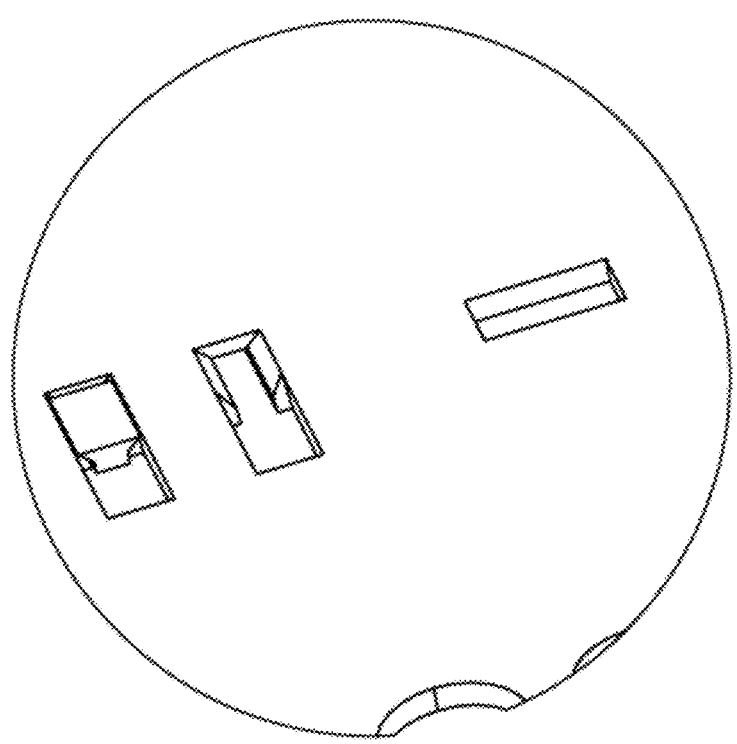
FIG. 28 is a partial enlarged view of FIG. 26.
Figure 29:
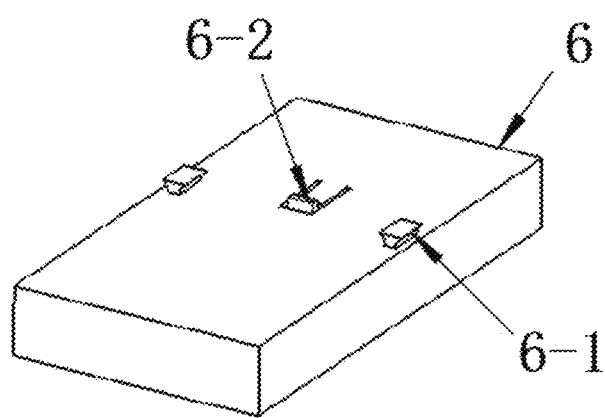
FIG. 29 is a schematic diagram of a specially-made optical module of an optical fiber connector box according to the present invention.

As shown in FIG. 22 to FIG. 29, in a preferred embodiment of the present invention, an optional additional fiber storage disc 2-5 is disposed above a permanent fiber storage disc 2-3, the optional additional fiber storage disc 2-5 is located below an expanded optical fiber disc 2-7, and each expanded optical fiber disc is connected to a kidney-shaped hole 2-4-3 through a disc chaining hinge 2-6. The compatibility of the optical fiber connector box provided by the present invention can be improved by adding the optional additional fiber storage disc 2-5, so that the optical fiber connector box can be used for mounting the optical module and bearing the optical fiber, and therefore, the application scenarios of the optical fiber connector box is increased.

In the present invention, the expanded optical fiber disc 2-7 is provided with circular hole structures 2-7-1 arranged in an array manner for fixing an optical fiber thermal shrinkage sleeve clamping member 5, and V-shaped holes 2-7-2 and profiling holes 2-7-3 for fixing a specially-made optical module 6. The optional additional fiber storage disc 2-5 can be provided with an optical fiber access fiber storage disc interface 2-5-1, an optical cable pre-pressing structure 2-5-2, and a hole structure 2-5-3. A square hole at the optical fiber access fiber storage disc interface 2-5-1 can be used for fixing a cable tie, so that the optical cable is fixed on the fiber storage disc, and the optical cable is prevented from being broken due to the movement. The optical cable pre-pressing structure 2-5-2 can prevent the optical cable from being easily popped up after the optical cable is coiled into the fiber storage disc, thereby preventing an upper layer structure from breaking the optical cable. The hole structure 2-5-3 is used for mounting a hinge 2-6, so that the fiber storage disc is fixed to the optical fiber disc fixed bracket of the expanded optical fiber disc fixed bracket 2-4.

Further, in the present invention, the optional additional fiber storage disc 2-5 is disposed above the permanent fiber storage disc 2-3, the optional additional fiber storage disc 2-5 is located below the expanded optical fiber disc 2-7, and the expanded optical fiber disc is connected to the kidney-shaped hole 2-4-3 through the disc chaining hinge 2-6. The expanded optical fiber disc 2-7 is provided with the circular hole structures 2-7-1 arranged in an array manner for fixing the optical fiber thermal shrinkage sleeve clamping member 5, and the V-shaped holes 2-7-2 and the profiling holes 2-7-3 for fixing the specially-made optical module 6. The optical fiber thermal shrinkage sleeve clamping member 5 is provided with first structural clamping members 5-1, and the first structural clamping members 5-1 are in one-to-one correspondence with the circular hole structures 2-7-1. The specially-made optical module 6 is provided with V-shaped bosses 6-1 and profiling bosses 6-2, the V-shaped bosses 6-1 are in one-to-one correspondence with the V-shaped holes 2-7-2, and the profiling bosses 6-2 are in one-to-one correspondence with the profiling holes 2-7-3. The expanded optical fiber disc 2-7 is further provided with a cable pre-pressing structure 2-7-4 and a hinge mounting hole 2-7-5 used for mounting the disc chaining hinge 2-6.

Embodiment 5

Figure 20:
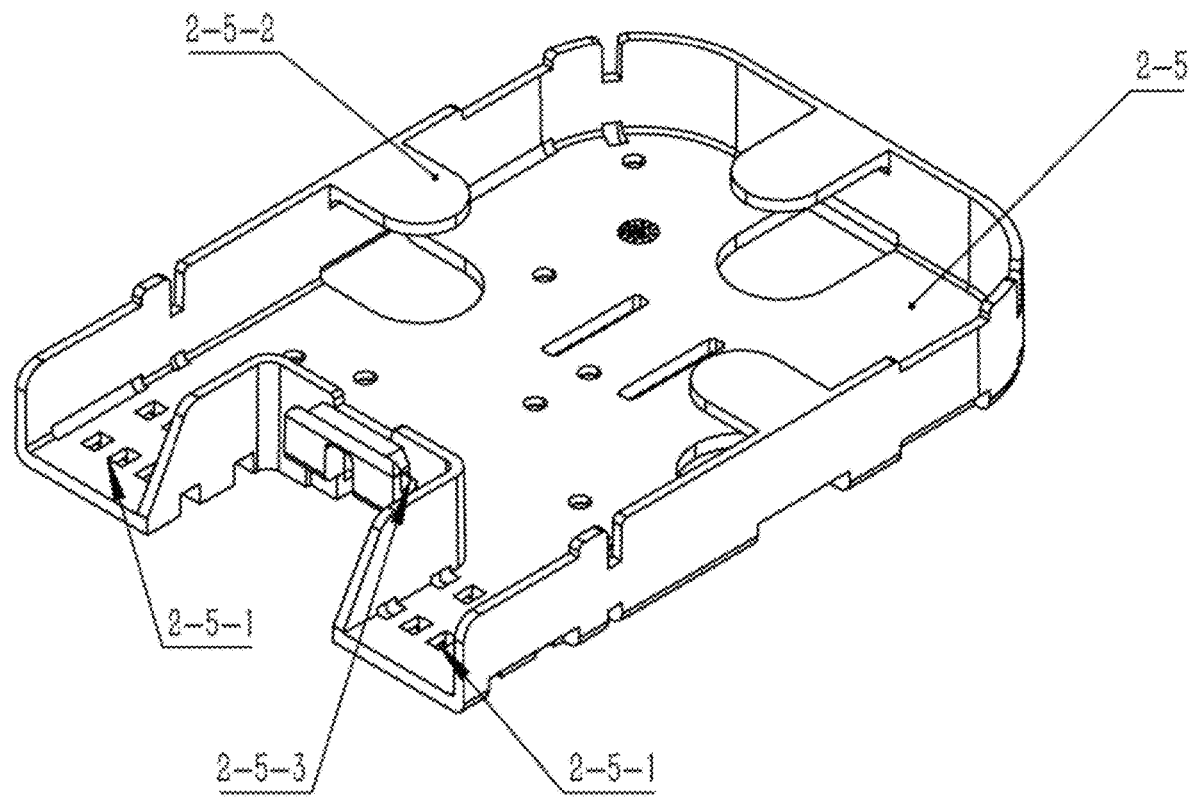
FIG. 20 is a schematic diagram of an optional additional fiber storage disc of an optical fiber connector box according to the present invention.
Figure 21:
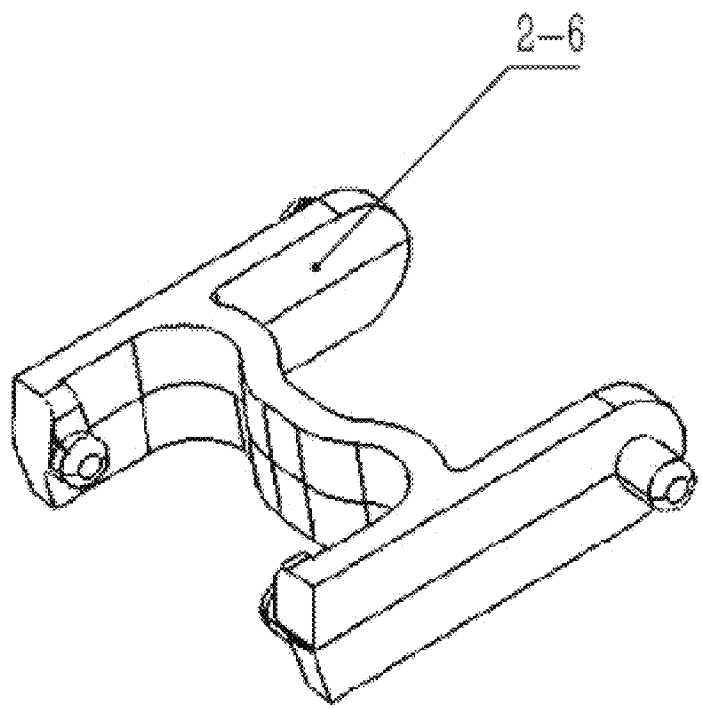
FIG. 21 is a schematic diagram of a disc chaining hinge of an optical fiber connector box according to the present invention.
Figure 30:
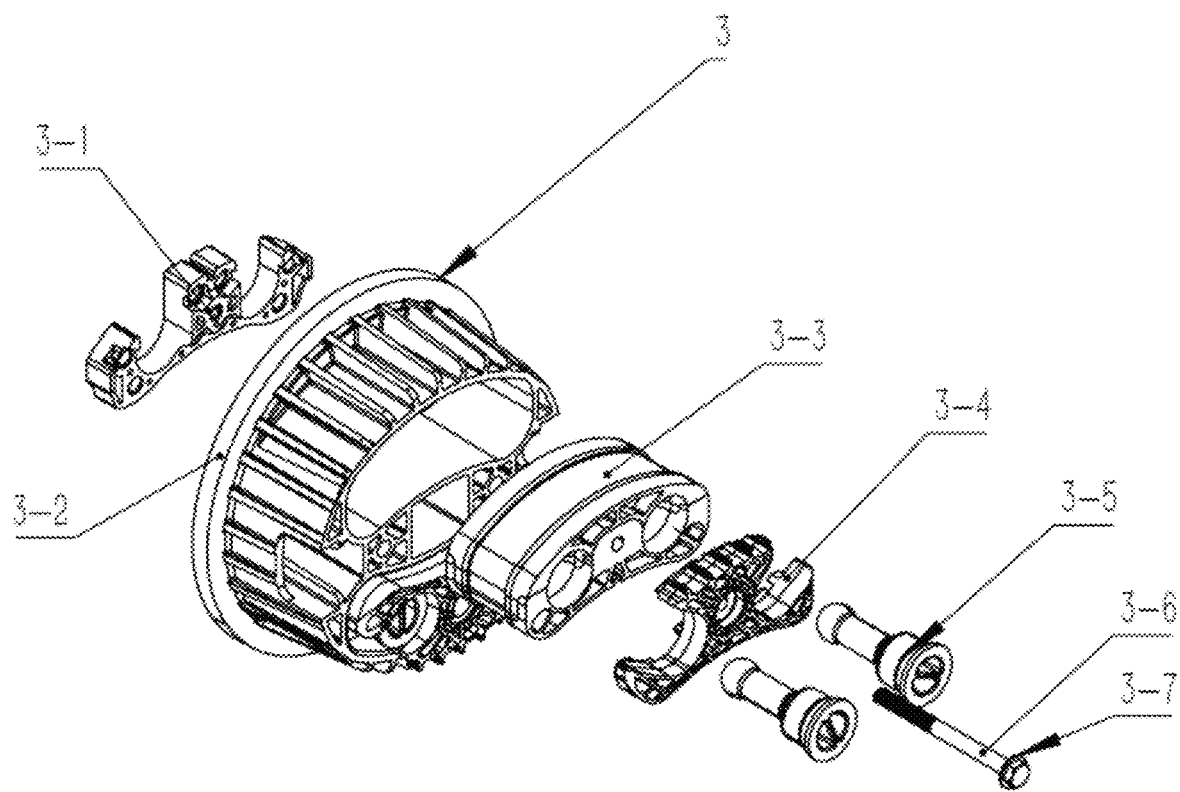
FIG. 30 is a schematic diagram of an end cover assembly of an optical fiber connector box according to the present invention.
Figure 31:
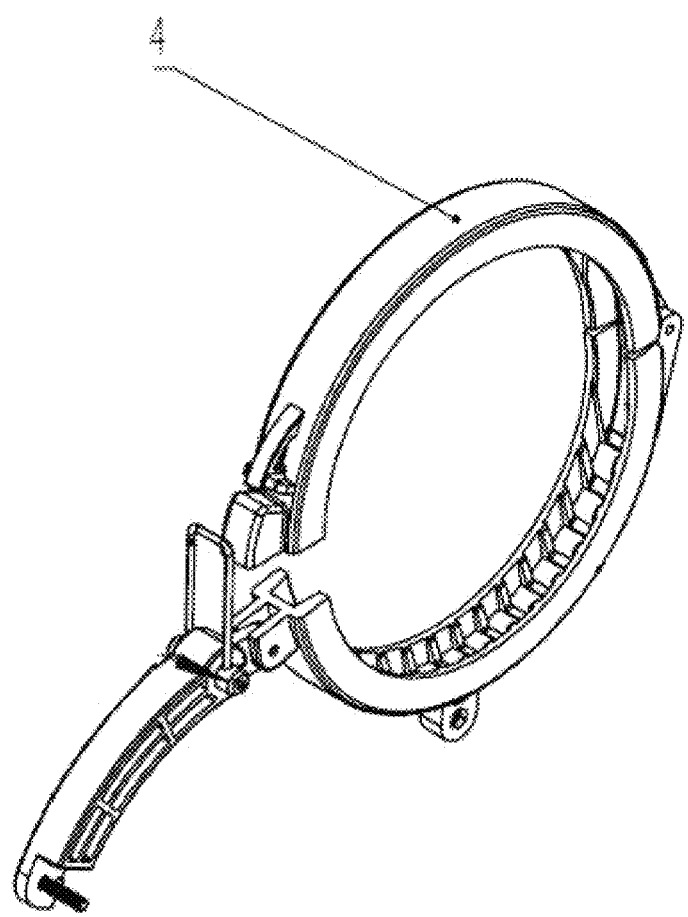
FIG. 31 is a schematic diagram of a hoop assembly of an optical fiber connector box according to the present invention.

As shown in FIG. 1 to FIG. 31, in a preferred embodiment of the present invention, the expanded optical fiber disc 2-7 is provided with circular hole structures 2-7-1 arranged in an array manner for fixing an optical fiber thermal shrinkage sleeve clamping member 5, and V-shaped holes 2-7-2 and profiling holes 2-7-3 for fixing a specially-made optical module 6. The optical fiber thermal shrinkage sleeve clamping member 5 is provided with first structural clamping members 5-1, and the first structural clamping members 5-1 are in one-to-one correspondence with the circular hole structures 2-7-1. The circular hole structures 2-7-1 are used for mounting and fixing the optical fiber thermal shrinkage sleeve clamping member 5. The first structural clamping members 5-1 on the optical fiber thermal shrinkage sleeve clamping member 5 is of a small protruding structure and can be clamped into the circular hole structure 2-7-1 corresponding to the expanded disc. Meanwhile, two groups of three clamping member holes are formed in the circular hole structure 2-7-1, so that the optical fiber thermal shrinkage sleeve clamping members with different widths can be conveniently selected and mounted. The structure has the advantages of being convenient to assemble and good in compatibility.

Further, in the present invention, the specially-made optical module 6 is provided with V-shaped bosses 6-1 and profiling bosses 6-2, The V-shaped bosses 6-1 and profiling bosses 6-2 are used in cooperation, and are used for mounting the specially-made optical module. The V-shaped bosses 6-1 are in one-to-one correspondence with the V-shaped holes 2-7-2, and the profiling bosses 6-2 are in one-to-one correspondence with the profiling holes 2-7-3. The specially-made optical module 6 is a special material optical module, and the V-shaped bosses 6-1 on the specially-made optical module slides into the V-shaped holes 2-7-2 normally, so that the special material optical module cannot be easily pulled up or shaken left and right. After the specially-made optical module continues to slide in, the profiling bosses 6-2 are clamped into the profiling holes 2-7-3, so that the special material optical module cannot be easily moved forwards and backwards, and then the special material optical module is completely fixed to the expanded disc. The structure has the advantages of being simple in structure and convenient to assemble.

Embodiment 6

In a preferred embodiment of the present invention, a protection structure 2-2 is used for hiding and protecting a metal bracket. An end cover assembly 3 includes a lower pressing plate structure 3-1, a main body end cover 3-2, a gel sealing assembly 3-3, a balance pressing plate part 3-4, a plug part 3-5, a bolt 3-6, and a gasket 3-7. Only two groups of sealing cavity structures are reserved in the end cover assembly 3, so that the bearing structure of a micro optical fiber connector box is reduced, the overall optical fiber connector box is reduced, and miniaturization requirements for the last-mile is met.

It can be understood that the box body 1, the end cover assembly 3, and the hoop assembly 4 disclosed by the present invention all belong to the prior art, and a mutual connection relationship and a connection manner among the box body, the end cover assembly, and the hoop assembly can refer to the content disclosed in the specification of the Chinese patent CN116609907A. Further, the disc chaining hinge 2-6 disclosed by the present invention also belongs to the prior art, and the structure and the working principle of the disc chaining hinge can refer to the content disclosed in the specification of the Chinese patent CN116125614A.

In the description of the present application, it should be noted that, the orientations or positional relationships indicated by the terms "up", "down", etc. are based on those shown in the accompanying drawings, intended only for the convenience of describing the present application and for simplifying the description, and not intended to indicate or imply that the referred apparatus or element must be provided with a particular orientation or constructed and operated with a particular orientation, therefore not allowed to be construed as a limitation of the present application. Unless otherwise explicitly specified and limited, the terms "mounted", "attached", "connected" should be understood in a broad sense, e.g., it may be a fixed connection, a detachable connection or an integral connection; it may be a mechanical connection or an electrical connection; it may be a direct attachment, or an indirect attachment through an intermediate medium; and it may be a communication within two elements. For those of ordinary skill in the art, the specific meanings of the above terms in the present application can be understood on a case-by-case basis.

It should be noted that in the present application, relational terms such as first and second are used merely to distinguish one entity or operation from another entity or operation and do not necessarily require or imply the existence of any such actual relationship or sequence between these entities or operations. Moreover, the terms "include", "comprise", or any other variants thereof are intended to cover non-exclusive inclusion, so that a process, method, item, or device including a series of elements includes not only those elements but also other elements not explicitly listed, or further includes inherent elements of such process, method, item, or device. An element preceded by "includes a . . . " does not, without more constraints, preclude the existence of additional identical elements in the process, method, article, or device that includes the element.

The foregoing descriptions are merely specific implementations of the present application, so that a person skilled in the art can understand or implement the present application. Various modifications to these embodiments will be readily apparent to those skilled in the art, and the general principles defined herein may be implemented in other embodiments without departing from the spirit or scope of the present application. Therefore, the present application will not be limited to the embodiments shown herein but is to be accorded the widest scope consistent with the principles and novel features of disclosed herein.

What is claimed is:

1. An optical fiber connector box, comprising a box body (1), an end cover assembly (3), and a hoop assembly (4), wherein an internal assembly (2) connected to the end cover assembly (3) is disposed in the box body (1), the internal assembly (2) comprises an adapter metal bracket (2-1), an expanded optical fiber disc fixed bracket (2-4) and a permanent fiber storage disc (2-3) are connected to the adapter metal bracket (2-1), and the permanent fiber storage disc (2-3) is provided with a plurality of expanded optical fiber discs (2-7), wherein kidney-shaped holes (2-4-3) are formed in two sides of the expanded optical fiber disc fixed bracket (2-4), each expanded optical fiber disc (2-7) is connected to the kidney-shaped hole (2-4-3) through a disc chaining hinge (2-6), the expanded optical fiber disc (2-7) can displace along a straight line of the kidney-shaped hole (2-4-3), the expanded optical fiber disc (2-7) can rotate around the disc chaining hinge (2-6), a through hole extending along a central axis of the box body (1) is form in the middle of the expanded optical fiber disc fixed bracket (2-4), protruding structures (2-4-1) and in-groove notch structures (2-4-2) are respectively arranged on two inner side walls of the through hole in a mirror image array manner, the protruding structures (2-4-1) and notch structures (2-4-2) on the two inner side walls are arranged in one-to-one correspondence, a quick-release supporting member (2-8) can be inserted to the through hole, and the expanded optical fiber disc (2-7) located on an upper layer of the quick-release supporting member (2-8) is supported by the quick-release supporting member (2-8) to rotate by a certain angle.

2. The optical fiber connector box according to claim 1, wherein the quick-release supporting member (2-8) comprises a supporting portion (2-8-1) and a connecting portion (2-8-2), and the connecting portion (2-8-2) is provided with a protruding portion (2-8-4) matched with the notch structure (2-4-2) and a notch portion (2-8-3) matched with the protruding structure (2-4-1).

3. The optical fiber connector box according to claim 2, wherein the supporting portion (2-8-1) is cylindrical, the connecting portion (2-8-2) is in a boomerang shape, and an end portion of the connecting portion (2-8-2) is provided with a V-shaped end head (2-8-5).

4. The optical fiber connector box according to claim 1, wherein an optional additional fiber storage disc (2-5) is disposed above the permanent fiber storage disc (2-3), the optional additional fiber storage disc (2-5) is located below the expanded optical fiber disc (2-7), and the expanded optical fiber disc is connected to the kidney-shaped hole (2-4-3) through the disc chaining hinge (2-6).

5. The optical fiber connector box according to claim 1, wherein the expanded optical fiber disc (2-7) is provided with circular hole structures (2-7-1) arranged in an array manner for fixing an optical fiber thermal shrinkage sleeve clamping member (5), and V-shaped holes (2-7-2) and profiling holes (2-7-3) for fixing a specially-made optical module (6).

6. The optical fiber connector box according to claim 5, wherein the optical fiber thermal shrinkage sleeve clamping member (5) is provided with structural clamping members (5-1), and the structural clamping members (5-1) are in one-to-one correspondence with the circular hole structures (2-7-1).

7. The optical fiber connector box according to claim 5, wherein the specially-made optical module (6) is provided with V-shaped bosses (6-1) and profiling bosses (6-2), the V-shaped bosses (6-1) are in one-to-one correspondence with the V-shaped holes (2-7-2), and the profiling bosses (6-2) are in one-to-one correspondence with the profiling holes (2-7-3).

8. The optical fiber connector box according to claim 1, wherein the end cover assembly (3) comprises a main body end cover (3-2), and only two groups of sealed cavity structure are disposed on the main body end cover (3-2).

9. The optical fiber connector box according to claim 4, wherein the optional additional fiber storage disc (2-5) is provided with an optical fiber access fiber storage disc interface (2-5-1), an optical cable pre-pressing structure (2-5-2), and a hole structure (2-5-3) for connecting the disc chaining hinge (2-6).

10. The optical fiber connector box according to claim 1, wherein the adapter metal bracket (2-1) is fixedly connected to the end cover assembly (3) through a protection structure (2-2), an upper end of the adapter metal bracket (2-1) is fixedly connected to the expanded optical fiber disc fixed bracket (2-4), and a lower end of the adapter metal bracket (2-1) is fixedly connected to the permanent fiber storage disc (2-3).

* * * * *